United States Patent [19]

Kalsi

[11] Patent Number: 4,610,319
[45] Date of Patent: Sep. 9, 1986

[54] HYDRODYNAMIC LUBRICANT SEAL FOR DRILL BITS

[76] Inventor: Manmohan S. Kalsi, 14307 Chevy Chase, Houston, Tex. 77079

[21] Appl. No.: 660,695

[22] Filed: Oct. 15, 1984

[51] Int. Cl.$^4$ .......................... E21B 10/22; F16J 15/34; F16C 33/74
[52] U.S. Cl. ..................................... 175/371; 277/134; 277/207 R; 277/215; 384/94; 384/153; 384/477
[58] Field of Search ................. 384/94, 130, 132, 151, 384/153, 477, 478, 479; 175/371, 372; 277/134, 165, 215, 207 R, 96.1

[56] References Cited

U.S. PATENT DOCUMENTS

| | | | |
|---|---|---|---|
| 3,744,805 | 7/1973 | Heinrich | 277/96.1 |
| 3,862,762 | 1/1975 | Millsap | 384/94 X |
| 3,929,340 | 12/1975 | Peisker | 277/134 X |
| 3,973,781 | 8/1976 | Grorich | 384/153 X |
| 4,037,673 | 7/1977 | Justman | 175/371 |
| 4,288,083 | 9/1981 | Braconier | 277/134 |
| 4,399,998 | 8/1983 | Otto | 277/134 |

FOREIGN PATENT DOCUMENTS 499480 1/1939 United Kingdom ................ 277/134

Primary Examiner—Stuart S. Levy
Assistant Examiner—David Werner
Attorney, Agent, or Firm—Gunn, Lee & Jackson

[57] ABSTRACT

A hyrodynamic lubricant sealing element for devices such as rotary cone rock bits, shaft seals and the like which is maintained under sufficient mechanical compression to effect a seal between relatively movable structures. The sealing element defines a sealing surface establishing a seal interface with a relatively movable circular sealing surface and forms a lubricant interface and a contaminant interface at opposite sides thereof. The lubricant interface is of such configuration as to induce a hydrodynamic lubricant wedging activity causing migration of lubricant film in the seal interface from the lubricant interface to the contaminant interface for flushing away any contaminant and for lubrication between the sealing element and sealing surface. The contaminant is of a configuration developing substantially no such hydrodynamic wedging activity at the contaminant interface and yet presenting a scraping edge to remove contaminant material from the sealing surface upon relative axial movement of the sealing surface and sealing element.

29 Claims, 15 Drawing Figures

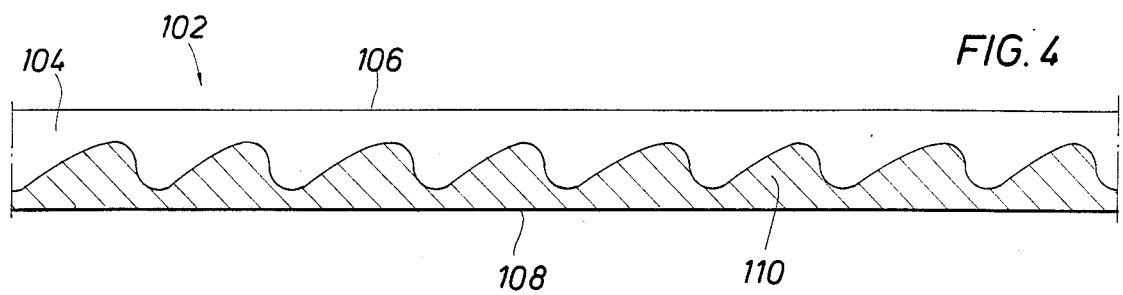
FIG. 4
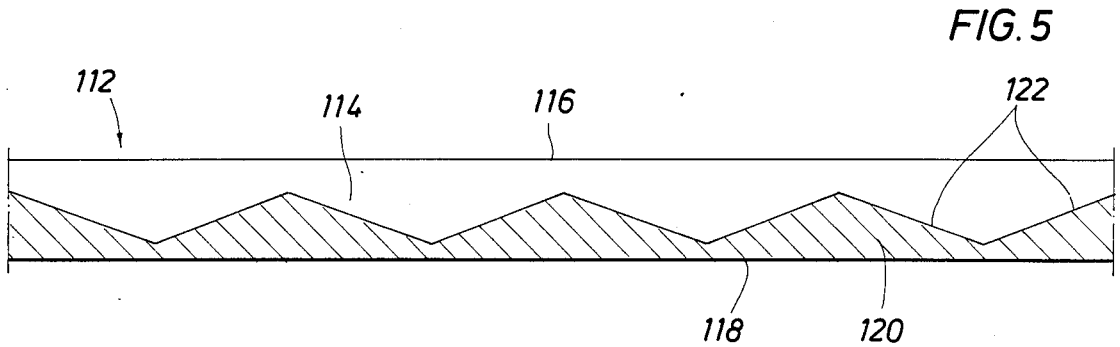
FIG. 5
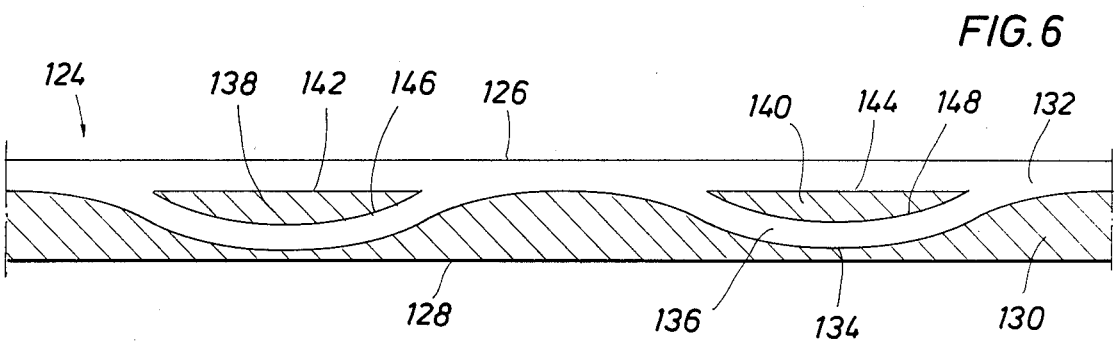
FIG. 6
FIG. 7A 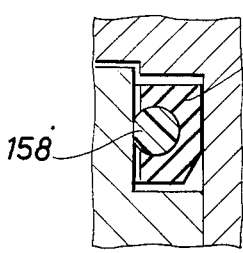 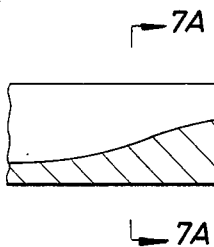

FIG. 8A 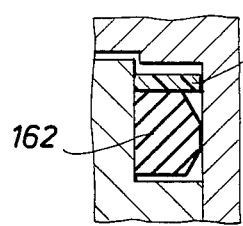 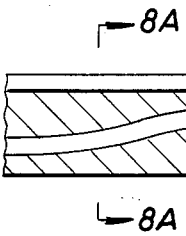

HYDRODYNAMIC LUBRICANT SEAL FOR DRILL BITS

FIELD OF THE INVENTION

This invention relates generally to rotary cone cutter type rock bits for drilling bores in hard earth or rock formations and, more particularly, concerns a hydrodynamically lubricated seal that greatly enhances seal life during drilling operations. The lubricant seal concept of this invention provides for the development of a hydrodynamic lubricant film by a wedging action on the lubricant side of the seal and substantially no hydrodynamic activity on the mud side of the seal whereby lubricant is hydrodynamically transferred from the lubricant side across the seal interface to the mud slide, while simultaneously preventing the reverse to occur. The seal provides for continuous flushing away of drilling particles with hydrodynamically induced lubricant flow as well as continuously providing a scraping activity to prevent migration of particulate into the interface between the sealing member and the relatively rotating and axially movable surface of the drill bit against which it seals. This seal design eliminates direct rubbing contact between the surface of the elastomer lubricant seal and the metal counterface of the rotary cone or the shaft, as the case may be, by the presence of the lubricant film. The presence of the lubricant film and the prevention of the mud contaminants at the sealing interface is responsible for extending the life of the lubricant seal well beyond that of presently available seals.

BACKGROUND OF THE INVENTION

Although a number of different general types of drill bits are provided for drilling earth formations, the drill bit construction under consideration herein is generally known as a rotary cone type rock bit. A drill bit body structure is provided which is threadedly connectable to drill pipe that is supported and rotated by a drilling rig. The body structure of the drill bit provides leg structures each having stub shafts or axles which provide support for rotary cone type cutter elements that cut away the formation as the drill bit is rotated. Typically, the drill bit is provided with an internal lubrication system having a quantity of fairly viscous lubricant which is retained within the lubrication system by means of sealing elements at each of the rotary cone members. Although virtually all rotary cone type drill bits incorporate lubricant seals, it is also well known that these seals tend to wear rather rapidly because of the harsh abrasive environment within which the drill bit operates. The lubricant seal element of each of the rotary cone cutters of the drill bit is subjected to drilling fluid which contains fine abrasive particulate such as bentonite and drill cuttings eroded from the formation during drilling operations. The drilling fluid, typically known as drilling mud, utilizes water and other liquid materials as a carrier constituent for the solid particulate of the drilling fluid.

A majority of the bearing failures in the drill bits are preceded by failure of the seal which is intended to keep the lubricant inside the bit. Seals are the weakest link in the sealed lubrication systems currently being used in various drill bit designs. A drill bit seal is expected to operate under a very harsh environment which includes abrasive mud, high temperatures and complex movement between the cutter cone and the axis of the shaft that is mounted on. These movements include axial play, radial play, cone wobbling from side to side and a combination of the above. As the bearing wear continues, these radial and axial movements also continue to increase. Associated with these complex cutter movements, it is estimated that pressure fluctuations of high frequency and magnitude reaching ±50 psi to ±100 psi or even greater are encountered. This is due to the inability of the pressure equalizing system to respond to these rapid fluctuations. A good seal design must have the ability to continue to perform its sealing function under the above movements, pressure fluctuations, high temperature and the abrasive mud environment with a low leakage rate and the design must also provide an extended service life.

Several seal designs have been used by various bit manufacturers which have gradually improved the seal life over the years. One of the more widely used seal designs at present is set forth in U.S. Pat. No. 3,397,927 of Hughes Tool Co. This particular seal design employs an O-ring with a high initial interference to accommodate the cone movements and yet have sufficient compression available to compensate for the high magnitude of abrasive wear that this seal is subjected to. Such a seal operates under "brute force" approach, i.e. using increased seal compression to prolong seal life; it is not designed to operate under any definitive mechanism of hydrodynamic lubrication and therefore allows a direct contact between the elastomeric sealing surface against the relatively rotating metal surface of the cone or shaft, as the case may be. Because of the direct rubbing contact between the seal and the metal surface, abrasive wear of the elastomeric material takes place rather quickly. This problem is further aggravated by the relative axial movement that typically occurs between the seal and its mating surface on the cone. There is a tendency for the abrasive mud particles to be wedged under the sealing interface due to this relative axial movement. This wedging of the mud particles is caused by the gradually converging shape of the O-ring cross-section outside the contact width zone of the sealing surface. The net result of the lack of a lubricant film and the ingress of the abrasive mud particles at the sealing interface is that the elastomeric material of the seal is subject to a high wear rate, thus giving a relatively short seal life. A major percentage of the initial compression of the O-ring seal is thus used up in feeding elastomeric material to compensate for the abrasive wear while maintaining a seal. In order to prolong the seal life, softer elastomers and higher initial compressions have been used.

Another problem associated with such seals is the high rate of heat generation and a localized increase in interfacial temperature of the seal. This is due to high friction which occurs at the dynamic interface in the absence of a lubricant film. High initial interference further aggravates the situation, resulting in further increase in seal temperature. The localized temperatures under the seal interface are thus significantly higher than the ambient environment, which results in a severe reduction of seal life due to the blistering, scorching and hardening of the seal material. Because the temperature generated at the seal interface increases dramatically as the rubbing speed is increased, this seal is not suitable for high bit speeds.

Another design that is described in U.S. Pat. No. 3,765,495 of G. W. Murphy Industries provides competitively equivalent seal life through utilization of a deeper oval cross-section seal to accomplish a larger initial compression of the seal while maintaining a percentage compression ratio of below 10 percent. This seal design also operates with no lubrication at the sealing interface and has well-rounded edges on both the lubricant side and the mud slide which results in wedging of abrasive mud particles in the seal interface due to relative axial motion. The life of this design is also relatively short and comparable to the high interference O-ring seal described earlier.

It is well-known that hydrodynamic lubrication can dramatically improve the life of rotary shaft seals in a clean environment. Prior art shows several designs of elastomeric seals that operate on the basis of hydrodynamic lubrication. By creating a hydrodynamic film thickness of sufficient magnitude, a complete separation between the asperities of the two rubbing surfaces (the elastomeric surface of the seal and the metal surface of the rotating part) can be achieved. This can provide a virtually wear-free seal in a clean, lubricated environment. For example, U.S. Pat. Nos. 3,449,021; 2,867,462; 3,831,954; 2,571,500; 3,195,902; 2,647,770; and 3,272,521 deal with slanted sealing surfaces between tubular members to create hydrodynamic action. U.S. Pat. No. 3,449,021 illustrates such a seal for use between relatively rotating surfaces. Such designs, however, are not suitable for use where an abrasive fluid medium is present as in well drilling applications where the fluid is in intimate contact with the seal due to the high level of agitation. This is due to the tendency of these designs to also promote a strong wedging activity on the mud side, forcing abrasive mud particles from the mud side into the sealing interface which creates very rapid wear due to abrasion and results in early failure of the seal. Thus, even though these designs work successfully in a clean lubricated environment, they are totally unsuitable for conditions where the seal is exposed to the abrasive fluids, such as drilling mud.

The characteristics of lubrication of hydrodynamic seals have been studied by the inventor and reported in several articles. Kalsi, M. S. and G. A. Fazekas, "Feasibility Study of a Slanted 'O-ring' as a High Pressure Rotary Seal," ASME Paper No. 72-WA/DE-14 (1972); Kalsi, M. S., "Elastohydrodynamic Lubrication of Offset O-Ring Rotary Seal," ASME Paper No. 80-C2/Lub-7 (1980) and in a dissertation of the same title submitted to the University of Houston in 1975. This study deals with the fundamental lubrication principles for successful use of the hydrodynamic seals in rotary shaft applications. These studies were confined to O-ring cross-section seals operating in clean lubricated environment.

An invention utilizing a slanted seal principle for use in mud motors for drilling applications is disclosed in application Ser. No. 462,464 of Monmohan Singh Kalsi filed Jan. 31, 1983 now U.S. Pat. No. 4,484,753. This invention also employs the principles of hydrodynamic lubrication in a rotary shaft seal and successfully overcomes the application problems that are prevalent in mud motor applications. Specifically, the slanted mud motor seal is designed to operate under high differential pressures utilizing a differential area principle in conjunction with hydrodynamic sealing principles to obtain extended life for the application. It should be pointed out that the use of such a seal in a drill bit application is not technically feasible because of the severe dimensional constraints that must be adhered to. Further, the complexity, bulk and high cost involved with such a seal renders its use in drill bit applications impractical. In drill bit applications, the seal must be very compact, preferably fitting into the dimensional constraint imposed by drill bit designs of the current configuration. Seals of this nature must also provide a very low leakage rate and a simple construction to be practically implemented in drill bits. The drill bit seal operates approximately under zero or relatively low mean differential pressures; therefore, some of the features used in mud motor seals to overcome the difficulties imposed by high differential pressure sealing are not necessary. Also, unlike in mud motor seals described, one cannot rely on a high lubricant leakage rate across the seal to prolong the seal life because of the limited capacity of the pressure equalizing reservoir commonly used in the drill bits. Therefore, this specific application requires a seal that operates under a very low leakage rate, yet prolongs the seal life. Another feature that is required in the drill bit seals to successfully extend their service life is to combat any tendency for ingress of abrasive mud particles into the sealing interface under relative axial motion between the seal and the shaft or cone, as the case may be. This problem does not exist in mud motor seals as the relatively rotating members are substantially fixed in the axial direction with respect to each other by a rigid bearing system. The present invention decribes a seal which successfully overcomes the problems enumerated above for a rotary cone drill bit.

SUMMARY OF THE INVENTION

From the standpoint of the basic concept, a sealing element is provided which presents a different geometry on the lubricant side where promotion of hydrodynamic lubrication action is intended than the seal geometry on the abrasive mud side where avoidance of any hydrodynamic activity is desirable. The invention employs a lubricant sealing element of generally circular form having a hydrodynamic shape on the lubricant side defining one or more waves, the amplitude and shape of which is selected to create a desirable amount of hydrodynamic film due to the relative rotation at the seal interface. On the mud side of the sealing element, the geometry of the seal can take a number of forms which substantially prevent any hydrodynamic activity due to the relative motion between the seal member and the corresponding rotating surface of the drill bit cone or shaft. The geometry of the seal on the mud side also successfully combats substantially any wedging action of the abrasive mud particles due to the relative axial movement between the dynamic surface of the seal and the counterface of the shaft or the cone. In its simplest form the seal can define a series of sinusoidal waves on the lip exposed to the lubricant side and have a planar annular cylindrical surface on the abrasive mud side.

Hydrodynamic sealing has not heretofore been used in drill bit applications because of the obvious problems of contaminant intrusion at the seal interface. In other non-drill bit seal applications, many hydrodynamic seal designs try to promote lubrication of the sealing interface from both the lubricant and the nonlubricant side of the seal. It is a specific object of this invention to employ hydrodynamic lubrication in drill bit seals and to promote hydrodynamic activity only on the lubricant side and substantially eliminate such activity on the mud side of the seal. This seal design, therefore, does not try to recapture any of the lubricant that is transferred from the lubricant side to the nonlubricant or contaminant side as is done in conventional hydrodynamically lubricated seals of prior art relating to devices other than rotary cone drill bits. The seal geometry thus utilized results in a net lubricant flow from the lubricant side to the mud side. The geometry of the wave-form on the lubricant side is selected so as to create a film thickness of desirable magnitude but still maintain a leakage rate as low as possible and compatible with the reservoir volume available in the pressure compensating lubricant reservoir system. Unlike the seals being currently used in drill bits, this bit design will experience a desirable and consistent leakage rate throughout the operational life of the seal. The current designs show virtually no leakage in the beginning and, because of the lack of lubrication, have a short life resulting in a sudden but high leakage rate at failure.

On the mud side, the seal member presents a substantially non-converging edge to contaminants such as drilling fluid to prevent the drilling fluid from developing any degree of hydrodynamic lift as relative rotation occurs between the sealing element and the surface against which it seals. This non-converging shape also prevents any hydrodynamic lifting activity during relative axial motion between the seal and the cone or shaft.

Conventional O-ring cross-section presents inclined converging surfaces to the drilling fluid and therefore are subject to some degree of wedging action permitting contaminant access to the sealing interface during axial motion. In prior drill bits, the durometer of the sealing material has been decreased to some degree and the degree of sealing compression has been controlled to ensure against migration of contaminants between the relatively rotating sealing surfaces. The present invention, however, by virtue of the cross-sectional configuration of the sealing member and its contaminant interface/lubricant interface design, effectively prevents migration of contaminants toward the lubricant interface surfaces of the seal. At its lubricant interface, the sealing element defines a surface forming at least one and preferably a plurality of waves which may be in the form of smooth sine waves or waves of differing design. The sealing element on the lubricant side is formed to define an undulating hydrodynamic geometry forming an inclined surface as viewed in cross-section that cooperates with the circular metal sealing surface of the cone or shaft to form a hydrodynamic entrance zone of greater width toward the lubricant chamber and gradually tapering to a minimal dimension at the point of contact. The undulating surface geometry establishes a seal contact width that varies circumferentially dependent on that location of the seal cross-section being considered. The gradually tapering surface of the seal at its point of contact with the relatively rotatable metal sealing surface of the roller cone or shaft of the drill bit, as the case may be, defines a merging radius to prevent or minimize any scraping activity that might interfere with the flow of lubricant film toward the mud side. As relative rotation occurs between the seal member and the circular metal sealing surface, the undulating design of the seal member at the lubricant interface surface thereof causes development of hydrodynamic lifting forces at the contact between the seal and the relatively rotating sealing surface. These forces cause slight lifting of the sealing material of the seal from the metal sealing surface and thus develop a minute pumping activity causing an extremely small but definite quantity of lubricant to migrate under hydrodynamic influence from the lubricant interface of the seal member toward the contaminant interface. This migration of lubricant develops a flushing action to ensure continuous removal of any abrasive particulate that might be present near the contaminant interface of the seal. Also, the separation caused by the introduction of a hydrodynamic lubricant film at the seal interface of the seal with the metal surface eliminates a direct rubbing contact and associated wear. It also ensures continuous maintenance of minimal friction between the sealing member and the metal sealing surface and maintains a low temperature environment to thus ensure enhanced operational life of the sealing element. In fact, the film of lubricant actually maintains a minutely spaced relation between the elastomer material of the seal and the metal sealing surface. These cooperative features promote the development of a hydrodynamic seal for rotary cone type rock bits promoting service life that is greatly enhanced in comparison to similar rock bits being marketed at the present time.

This invention, though primarily designed for enhancing the wear capabilities of rock bits, also has application where rotary shafts are sealed with respect to housing with either the housing or shaft being the rotary member. This invention is also applicable when the sealing members of rotary cone rock bits or rotary shafts are composed of single piece elastomeric material or formed by two or more seal forming elements that may be of different material and which function in coordinated assembly.

BRIEF DESCRIPTION OF THE DRAWINGS

So that the manner in which the above-recited features, advantages and objects of the invention, as well as others which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of this invention and are not to be considered limiting of its scope, for the invention may admit to other equally effective embodiments.

IN THE DRAWINGS

Figure 1:
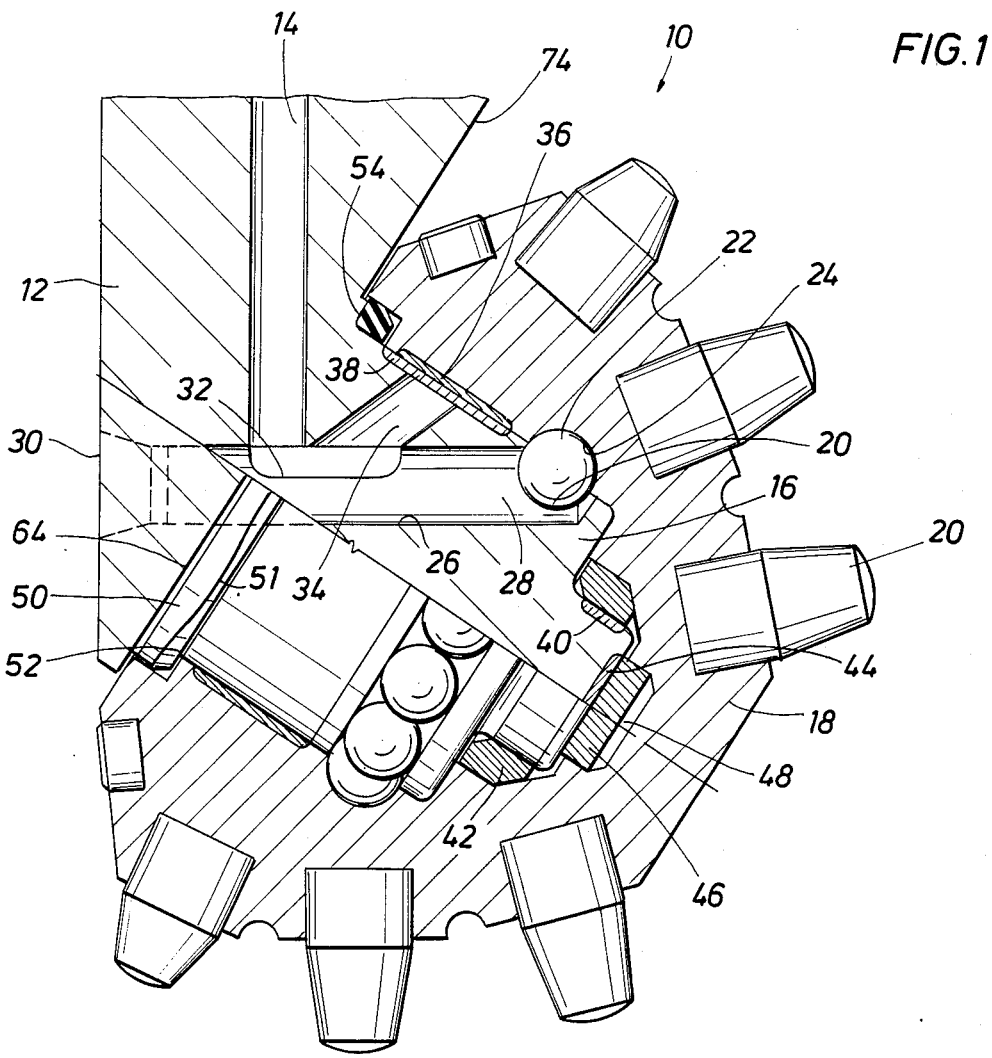

FIG. 1 is a partial sectional view of a rotary cone type drill bit showing an end of one of the leg portions of the body structure and illustrating rotary support and sealing of a rotary cone element in accordance with the features of this invention.

Figure 1A:
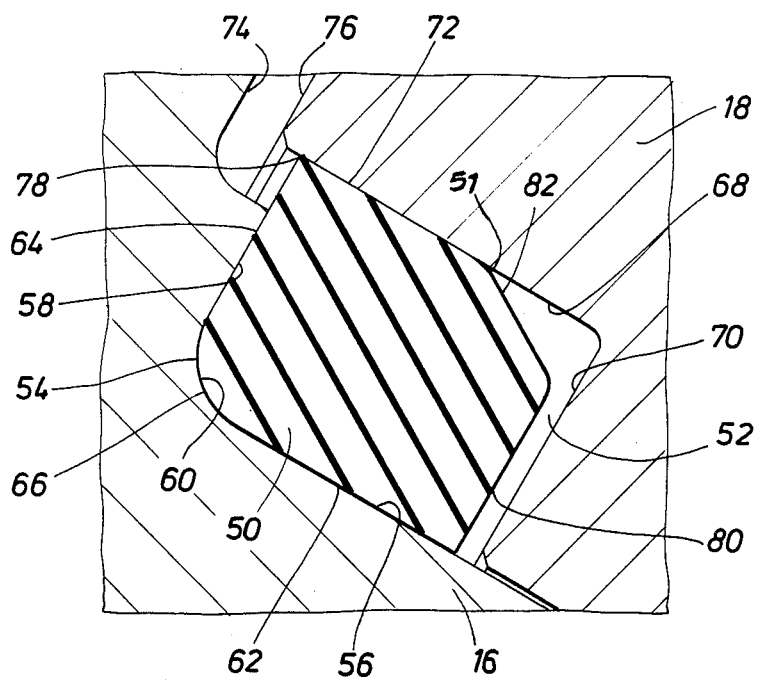

FIG. 1A is a fragmentary sectional view of the drill bit structure of FIG. 1 showing the sealing member and related parts of the drill bit in greater detail.

Figure 1B:
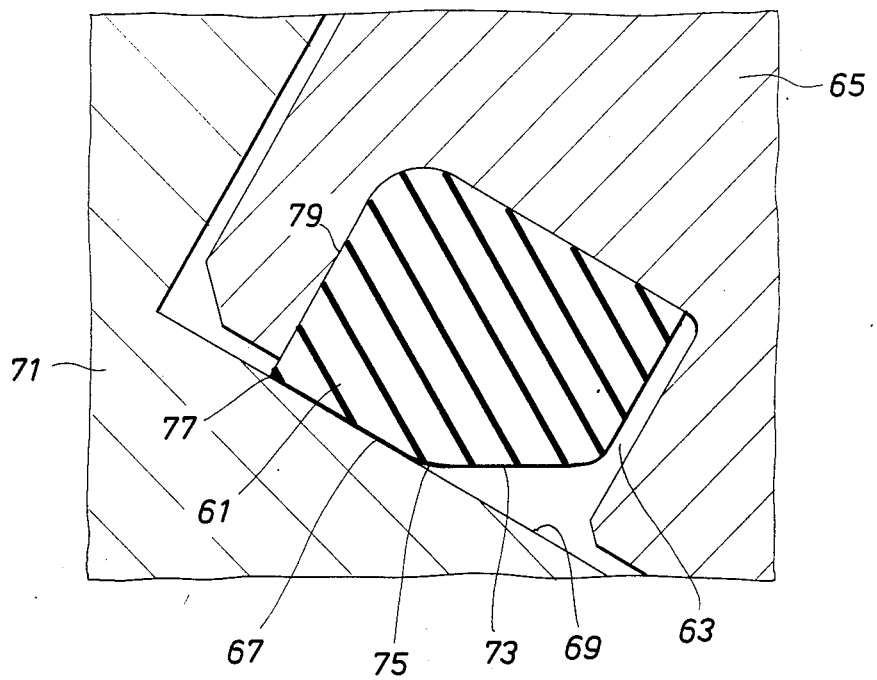

FIG. 1B is a fragmentary sectional view representing an alternative embodiment of this invention wherein the sealing member is rotatable along with the rotatable member.

Figure 2:
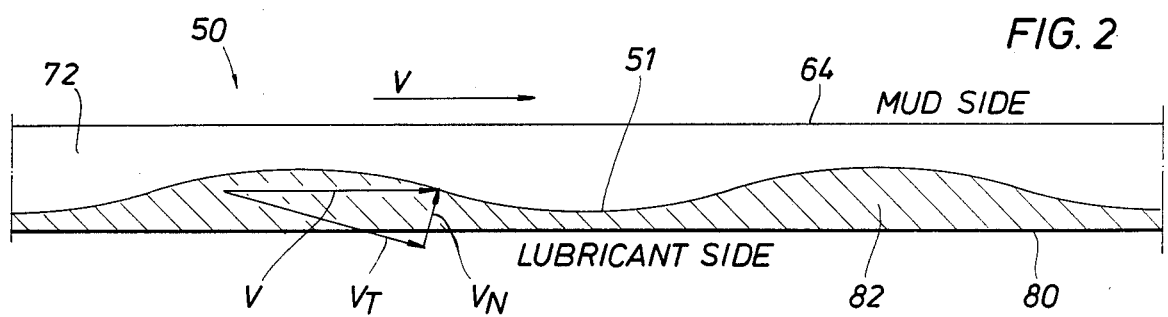

FIG. 2 is a linear diagram illustrating the circumferentially developed configuration of the circular sealing element of FIGS. 1 and 2 in conjunction with a corresponding velocity diagram.

Figure 3:
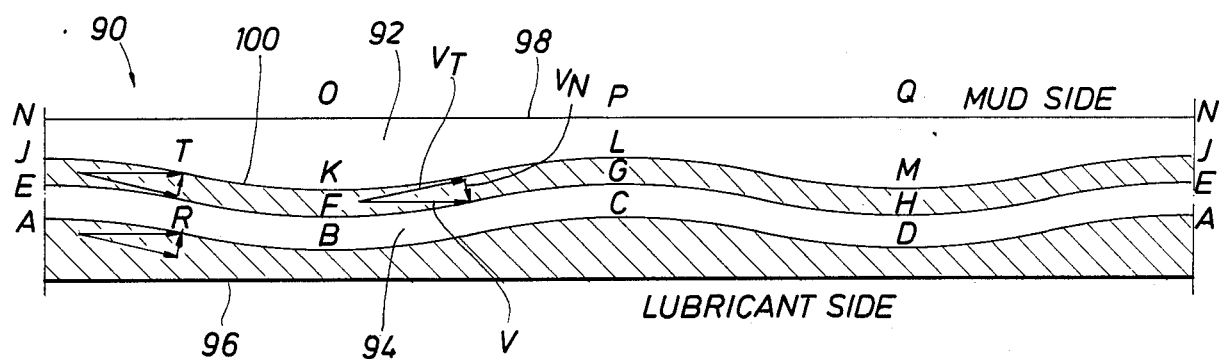

FIG. 3 is a circumferentially developed linear representation of a circular sealing element in diagrammatic form similar to that of FIG. 2 and representing a modified embodiment of this invention.

FIGS. 4 through 8 are circumferentially developed linear diagrams of circular sealing elements representing other embodiments of the present invention.

Figure 7:
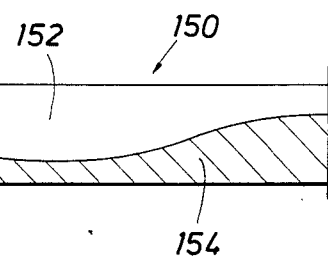

FIG. 7A is a fragmentary cross-sectional illustration and taken along line 7A—7A of FIG. 7 and showing a hydrodynamic sealing element constructed of two interrelated seal components.

Figure 8:
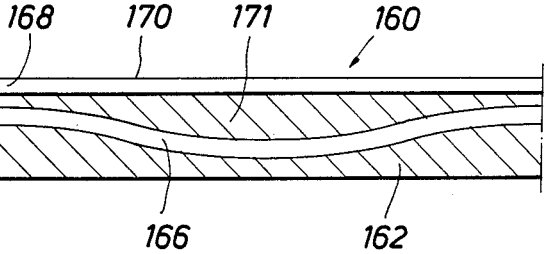

FIG. 8A is a fragmentary cross-sectional illustration similar to that of FIG. 7A, being taken along line 8A—8A of FIG. 8, and showing a modified hydrodynamic sealing element constructed of two interrelated seal components of different nature.

Figure 9:
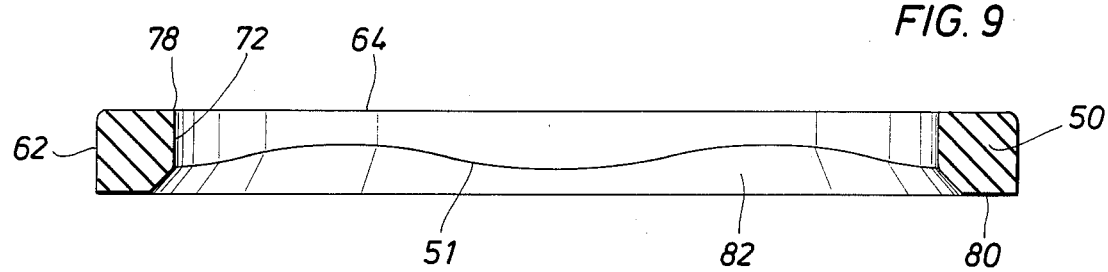

FIG. 9 is a sectional view of the hydrodynamic seal structure of FIGS. 1 and 1A showing a hydrodynamic surface of multiple sine-wave form.

Figure 10:
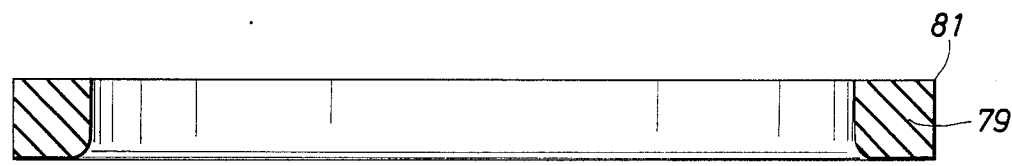

FIG. 10 is a sectional view of a circular sealing element defining an abrupt scraping edge on the contaminant side thereof.

Figure 11:
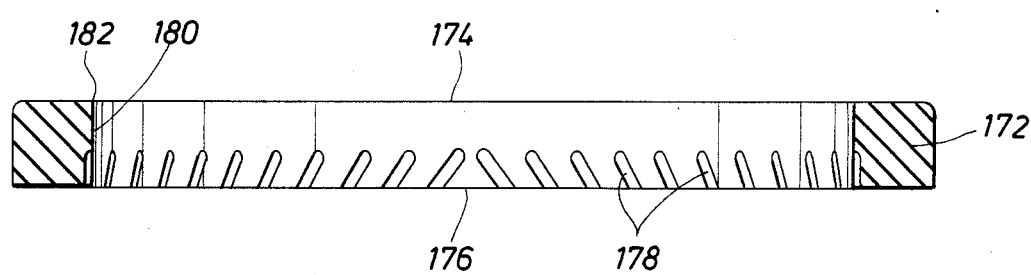

FIG. 11 is a sectional view of a hydrodynamic sealing element having multiple inclined hydrodynamic grooves of alternating pattern formed therein, said sealing element representing an alternative embodiment of this invention.

DETAILED DESCRIPTION OF PREFERRED EMBODIMENT

Referring now to the drawings and first to FIG. 1, there is shown in the partial sectional view generally at 10 the lower leg portion 12 of the body structure of a rock bit. The leg structure 12 is formed to define a lubricant passage 14 which is in communication with a lubricant supply system of conventional nature. For example, the lubricant supply system may conveniently take the form shown in U.S. Pat. No. 4,375,242, assigned to Hughes Tool Co., or a lubricant supply system of any other convenient form. The lubricant supply system does not constitute any portion of the present invention except to the extent that the hydrodynamic sealing member of the present invention is intended to be employed in conjunction with a drill bit having a lubricant supply system. The lower end of the body leg 12 is provided with an extended journal portion 16 about which is received a rotary cutter element 18 which is typically referred to as a rotary cone because of its generally conical configuration. The rotary cutter is provided with a plurality of cutter inserts 20 such as are typically formed of tungsten carbide or other suitable materials and which cut away the formation as the drill bit is rotated by rotation of the drill pipe to which it is connected. The rotary cutter cone and its cutting teeth may take any one of a number of suitable forms without departing from the spirit and scope of this invention.

The journal portion 16 of the leg 12 may consist of a plurality of bearing systems which support the rotary cutter element 18 and maintain it against separation from the journal. The journal defines a ball bearing race 20 within which is received a plurality of ball bearing elements 22. The rotary cutter element 18 also defines a corresponding circular bearing race 24 registering with race 20 and cooperating therewith to form a circular channel within which the ball bearings are received. The ball bearings provide for rotatable bearing support of the cutter 18 and also serve to retain the rotary cone cutter in assembly with the journal 16. The journal is provided with a bearing insert bore 26 receiving a plug member 28 which forms a portion of the bearing race 20. During assembly of the bit structure, the ball bearings are inserted through passage 26 into the bearing race with the rotary cutter element assembled to the journal in the manner shown in FIG. 1. Thereafter, the plug member 28 is positioned within the passage 26 and is secured in immovable relation with the journal by means of a weld connection 30 or by any other suitable means for plug retention. As shown, the plug member 28 is provided with a lubricant depression or groove 32 which is disposed in registry with the lubricant passage 14 and a lubricant branch passage 34. The lubricant branch passage conducts lubricant to the bearing interface defined between hardened cylindrical surfaces 36 of the rotary cone and 38 of the journal, thus providing a film of lubricant between these relatively movable cylindrical surfaces.

At the free extremity of the journal 16, a hardened cylindrical journal surface is provided at 40 against which is positioned a bushing member 42 forming a cylindrical bearing surface. The bushing 42 and the journal bearing surfaces 36 and 38 cooperate with the ball bearings 22 in the bearing race to prevent undue wobble of the rotary cutter element 18 as it rotates relative to the journal and responds to the loads induced by drilling. At the free extremity of the journal 16 a planar bearing surface is defined by hardened material 44 and an axial bearing insert 46 supported within a bearing pocket 48 of the rotary cutter 18 provides a bearing capability resisting axial thrust forces.

Although a specific bearing and bushing arrangement has been discussed for rotary bearing support of the cutter element 18 relative to the journal 16, such is not intended to be in any way limiting of the scope of this invention. Other bearing and bushing support systems and lubrication systems may be incorporated in conjunction with the present invention without departing from the spirit or scope thereof.

At the juncture of the rotary cutter element with the depending leg portion of the drill bit, there is typically provided a lubricant sealing element having the capability of retaining lubricant for lubrication of the bearing and bushing assembly and retarding migration of contaminants, such as drilling mud, into the bearing and bushing assembly. For example, U.S. Pat. No. 3,866,695 illustrates such a circular sealing member at 23 in FIG. 2 and U.S. Pat. No. Re. 28,625 shows lubricant sealing members at 26 in FIG. 1 and 86 in FIG. 4. In accordance with the present invention, as shown in FIG. 1, a circular sealing element 50 is shown to be received within a circular seal pocket 52 formed in the rotary cutter element 18. In the alternative, the sealing element may be received within a seal groove formed within the journal 16 within the teachings of this invention or in a groove formed in the cone as shown in FIG. 1B. The journal member 16, at its juncture with the depending leg portion 12 of the body structure, forms a circular seat 54 for maintaining stabilization of the sealing member 50. The sealing member may be composed of any one of a number of suitable sealing materials including elastomeric or rubber-like sealing material and various polymeric sealing materials.

The sealing element 50 of FIGS. 1, 1A, 2 and 9 is of a novel design which successfully introduces a hydrodynamic film of lubricant of a desired magnitude by promoting a wedging action on the lubrication side of the sealing member while preventing any such wedging action on the containment or mud side. The cross-section of this sealing element, as shown in FIGS. 1, 1A and 2, has a lip with sinusoidal contact shape on the lubricant side and a straight line contact on the mud side when viewed in a circumferentially developed representation of the contact pane due to the abrupt contact of planar surface 64 with the cylindrical surface 68 defined by the sharp corner 78. The number and amplitude of sine waves on the lubricant side of the sealing member can be effectively varied to achieve the desired magnitude and uniformity of hydrodynamic lubricant film thickness. As shown in FIG. 2, the relative velocity, "v," between the seal and the rotating cutter element of the drill bit can be broken down into a normal component, "$v_n$", and a tangential component, "$v_t$", with respect to the longitudinal direction of the seal. The normal component $v_n$ in conjunction with a gradually converging shape of the seal cross-section defined by converging surfaces 68 and 82 on the lubricant side as shown in FIG. 1A, creates a lifting action of the elastomeric sealing surface, thereby introducing a hydrodynamic film of lubricant at the interface. The tangential component $v_t$ promotes the transfer and distribution of this lubricant film in a circumferential direction of the seal. It should be noted that the hydrodynamic lifting action is created by the presence of the normal velocity component $v_n$ in conjunction with the presence of a gradually converging shape of the seal. Since the side of the seal that is exposed to the contaminant-laden drilling mud is of planar configuration, defining a perfect circle at sharp edge 78, no normal component of velocity is generated on the mud side of the seal due to the relative rotational velocity between the seal and the rotary cutter element.

FIG. 1A is a fragmentary cross-sectional illustration showing drill bit and rotary cutter components in assembly and with the sealing member 50 positioned within the seal pocket 52. As shown, the journal portion 16 of the leg member 12 forms a cylindrical journal surface 56 and a circular planar surface 58 which are intersected by a circular radiused surface 60. The surfaces 56, 58 and 60 cooperate to define the seal stabilizing receptacle 54 discussed in conjunction with FIG. 1. The sealing element 50 defines corresponding surfaces 62, 64 and 66 which engage the appropriate stabilizing surfaces and thereby ensure positive positioning of the sealing element during operation of the drill bit. The rotary cutter element 18 defines a cylindrical sealing surface 68 and a planar circular surface 70 which cooperate to define the circular seal pocket or receptacle 52. The sealing element 50 forms a circular sealing surface 72 which maintains sealing engagement with surface 68 of the rotary cutter. The sealing element 50 is maintained under sufficient compression between surfaces 56 and 68 to thereby ensure maintenance of the seal at the interface between surfaces 68 and 72 as well as surfaces 56 and 62 and to accommodate wobble of the cutter.

As mentioned above, the sealing element 50 provides a scraping activity under relative axial motion to ensure against migration of contaminants into the sealing interface between surfaces 68 and 72. At the juncture of the journal 16 with the leg portion 12 of the drill bit body there is defined a planar surface 74. The inner end surface 76 of the rotary cutter is of circular planar configuration and spaced from surface 74 thereby permitting access of contaminant laden liquid, such as drilling mud, to the planar surface 64 of the seal member 50. To prevent ingress of abrasive particulate into the sealing interface between surface 72 of the seal member and surface 68 of the rotary cutter, the seal member is provided with a scraping characteristic that is developed by a sharp circular edge or corner 78 which intersects the cylindrical surface 68 of the rotary cutter at a sharp angle, e.g. 90°. It should be borne in mind that the configuration of the sealing element at the contaminant interface may be of any configuration that develops substantially no hydrodynamic activity. Instead of the 90° angular relationship shown at corner 78, the angular relationship may be inclined as much as about 45° in either direction, acute or obtuse, from the annular corner without the risk of developing measurable hydrodynamic lift. The acute angular relationship, however, must be such that no significant wedging activity occurs. Further, the contaminant interface may be of any surface characteristic other than the planar surface shown at 64 so long as it does not develop hydrodynamic activity responsive to relative rotary motion. It is important that for any angle of the contaminant interface surface, a gradually converging shape be avoided because such could otherwise develop hydrodynamic activity on the mud side of the lubricant seal. For example, one could employ a wave-like geometry at the edge 78 similar to the wave-like shape employed in the vicinity of the contact edge 51, provided that the angle defined by the surface 64 with respect to the surface 72 of the seal is sufficiently abrupt to prevent development of any hydrodynamic activity. Hydrodynamic theory shows that for a 90° angle at edge 78 the hydrodynamic film activity produced from the mud side at the edge 78 is zero for any amplitude and number of waves on the surface 64. Even for angles differing from 90°, there is a minimum value of the angle for which the hydrodynamic activity is essentially negligible for any given rotational speed, lubricant viscosity, amplitude and number of waves. For example, it is also possible to employ a seal geometry which utilizes the same number and amplitude of waves both on the mud side and the lubricant side provided the seal cross-section defines a gradually converging shape on the lubricant side as shown by surface 82 and a substantially abrupt angle at the edge 78 on the mud side. This geometry will permit a uniform width of contact as the contact suface undulates circumferentially.

At the opposite axial extremity of the circular seal member 50, a planar surface 80 is defined which is maintained in spaced relation with respect to planar surface 70 of the rotary cutter. An angulated surface 82 is formed by the sealing member 50 which intersects cylindrical surface 72 and planar surface 80 of the sealing member forming a gradually merging or converging radiused edge 51. The angulated surface 82, though illustrated in FIG. 1A as being of generally conical configuration, may take any suitable form, such as concave, convex, etc., without departing from the spirit and scope hereof. The angulated surface 82 cooperates with cylindrical surface 68 to define a hydrodynamic lift area of the seal which responds to lubricant movement relative thereto to develop a lift-inducing force causing the cylindrical sealing interface surface 72 to be lifted slightly from the cylindrical sealing surface 68 by the hydrodynamic wedging action caused by the velocity component Vn. Further, as is evident from the linear diagrammatic view of FIG. 2, the tapered hydrodynamic lift surface 82 is of variable dimension along the circumferential length thereof, causing the sealing surface 72 to also be of varying dimension about the circumference of the seal. The intersection of the angulated surface 82 with respect to the cylindrical surface 72, as shown in FIG. 2, is in the form of a gently curving sine wave having two cycles per revolution.

FIG. 1B is a fragmentary sectional view representing an alternative embodiment of this invention wherein the sealing member is mounted in the rotatable member thus establishing a dynamic sealing interface against the stational journal. As shown in FIG. 1B, the sealing member 61 is retained within a circular seal groove 63 in member 65 and establishes a circular sealing lip 67 having relatively rotatable sealing engagement with cylindrical sealing surface 69 of member 71. The convoluted inclined surface 73 establishes intersection with the sealing lip 67 at a radiused edge 75. A scraping edge 77 is formed at the intersection of the contaminant face surface 70 with the sealing lip 67. The hydrodynamic seal 61 functions in the same manner as described herein in connection with seal member 50.

In addition to preventing hydrodynamic action on the mud side during rotary motion, it is also necessary to prevent such action during the relative axial motion. An feature of this lubricant seal design is the detail of the localized geometry of the seal cross-section in the vicinity of the contact between the cylindrical sealing surface 68 of the rotary cutter on the mud side. As shown in FIG. 1A, the seal geometry on the mud side has a very sharp, abrupt edge contact at 78, instead of a gradually converging cross-sectional shape as shown on the lubricant side. The lack of a gradually converging shape on the mud side prevents any wedging of the abrasive mud particles under the seal interface when the rotary cutter element is subjected to an axial movement relative to the seal.

In fact, this square edge very effectively functions as a scraper, to wipe the mating surface 68 of the cutter element clean during such axial movement of the cutter. Due to the positive hydrodynamic action created on the lubricant side of the sealing element, there is a definite quantity of lubricant leakage that is pumped out across the seal interface at sealing surfaces 68 and 72 during the relative rotation between the sealing member and the rotary cutter element. By proper selection of the amplitude and number of waves, this lubricant leakage can be made small and consistent, but it is sufficient to maintain the sealing interface flushed clean of any abrasive particles. The number of sine waves defined at the lubricant side of the sealing member and the amplitude of such sine waves can be selected in the design to create the desirable amount of hydrodynamic lubricant film as well as the lubricant pumping action that takes place. The lubricant reservoir is compatibly sized to have sufficient capacity to provide a continuous flow of lubricant at the seal interface during the expected service life of the sealing element.

It should be pointed out that an abrupt scraping edge geometry as described above integral to the seal on the mud side as shown in FIG. 10 can be expected to provide an improvement in the seal life even in seals having no hydrodynamic lubrication activity on the lubricant side. The scraping activity by itself be considered an improvement in current seal designs. FIG. 10 shows a sealing element 79 having an abrupt scraping edge 81 on the contaminant side which can be a square edge as shown or any abrupt angular configuration capable of accomplishing efficient scraping activity for removal of contaminant from the sealing surface upon relative axial movement of the seal and the sealing surface.

Another important advantage of employing a hydrodynamically lubricated seal for sealing between relatively rotatable surfaces is the low rate of heat generation at the sealing interface and a more effective heat transfer mechanism to keep the interfacial seal temperatures low. A constant wiping action takes place between the cone surface and the seal contact zone, which more effectivly transfers heat from the seal interface into the main volume of the lubricant. It has been found in controlled experiments by the inventor that this more effective heat transfer mechanism and a much lower level of heat generation is also responsible for extending the seal life significantly as compared to the seal life of conventional O-ring seals. In the conventional O-ring seals, the interfacial temperatures can become much higher than the bulk fluid temperature surrounding the seal, and can cause scorching and blistering of the elastomeric surface of the seal member. This detrimental activity hardens the elastomeric material which further accelerates the abrasive wear process that diminishes the life of such sealing elements. This problem becomes even more acute as the rotational speeds are increased. Therefore, the use of conventional O-ring sealing elements in the bit design limits their use to relatively low-speed applications. The hydrodynamically lubricated seal, on the other hand, has been tested and found to perform successfully at speeds much higher than those permitted by conventional O-ring type seals. Excellent performance from such seals at speeds well over 1,000 rpm has been obtained with hydrodynamically lubricated seals of the size typical in drill bits. This high speed compatability will permit the use of the hydrodynamically lubricated bit seal design of this invention in mud motor applications, which typically operate at much higher rpm.

Since this seal design effectively prevents the ingress of drilling mud at the seal interface and minimizes any direct contact between the elastomer sealing member and the dynamic metal surface, there is very little abrasion encountered during operation of the seal. In long term tests, it has been found that the cross-section of the seal changes by a negligible amount due to the combined effect of abrasive wear and permanent set when tested under significant differential pressures and high temperatures. Therefore, this seal design requires very little initial radial interference to compensate for wear, unlike in the present O-ring or oval cross-section drill bit seals which require significant radial interference. The magnitude of minimum interference that the seal is installed with should simply exceed the radial cone movements and the above negligible magnitude of wear. This is significantly in contrast to the approach typically utilized in the previous O-ring bit seals where an initial compression of 15% to 20% is regularly employed. A large percentage of that initial compression is simply provided to compensate for the high magnitude of abrasive wear present in O-ring sealing elements of conventional design to thus obtain increased seal service life. It should be pointed out that the hydrodynamically lubricated seal design of this invention also works very well with high initial squeeze although such is not necessary for its proper functioning. This is so because hydrodynamic film thickness is relatively insensitive to initial squeeze pressure and differential pressure of the system.

Several other variations of the basic hydrodynamically lubricated seal design discussed above in connection with FIGS. 1, 1A, 1B and 2 are disclosed in FIGS. 4 through 8A.

A circumferentially developed linear illustration of a double lipped embodiment of this invention is illustrated in FIG. 3 where a seal member illustrated generally at 90 provides a design having certain advantages over the seal design disclosed in conjunction with FIGS. 1, 1A and 2. This design, utilizes a simple elastomeric seal with a cross-section that promotes a complete hydrodynamic lubrication of the main sealing lip from both sides. As shown in this figure, the contact width of the seal is divided into two contacting lips 92 and 94. The sealing lip 94, being closest to the lubricant side 96 of the sealing member, is provided with a sinusoidal form along both of its axial edges A, B, C, D and E, F, G, H. The second sealing lip 92 establishing the mud side 98 at the abrupt scraping surface portion of the seal defines a straight edge, N, O, P, Q. The areas of the seal width not in contact with the rotating housing are shown crosshatched in this figure, whereas the areas that are in contact are left uncrosshatched. As is the hydrodynamically lubricated seal design discussed in conjunction with FIGS. 1, 1A, 1B and 2, a hydrodynamic wedging action is present on the side A, B, C, D of the main sealing lip 94 adjacent the lubricant side of the seal established by surface 96. This hydrodynamic pumping action transfers the lubricant to the opposite side of this seal lip 94 across the edge E, F, G, H. Thus, a pool of lubricant becomes trapped in the recessed cavity 100 defined by the sides E, F, G, H and J, K, L, M. This pool of lubricant creates an effective hydrodynamic lubricating action on the opposite side, E, F, G, H, of the first sealing lip 94. This results in the generation of a complete hydrodynamic film at the interface of the first sealing lip 94 from both sides. In other words, hydrodynamic activity takes place that forces lubricant back and forth between the lubricant side of the sealing member and the sinusoidal recessed cavity 100. This pool of lubricant in the intermediate cavity also lubricates the side J, K, L, M of the second sealing lip 92. As in the first design described earlier, the farthest side, N, O, P, Q, of the seal exposed to mud or other such contaminants is straight as defined by planar surface 98 and has an abrupt edge (instead of a convergent cross-sectional shape), thus avoiding any wedging action of the abrasive mud particles at the seal interface. The advantage of this construction is that the first lip 94 is very effectively hydrodynamically lubricated from both sides and better isolated from the abrasive mud, thus potentially prolonging its life even further. The sealing lip 92 on the mud side of the drilling bit is also hydrodynamically lubricated by a film of lubricant being transferred from the sinusoidal cavity 100 across the sealing interface toward the planar surface 98.

FIG. 4 is a linear representation of a hydrodynamic lubricant seal for drill bits, rotary shafts and the like shown generally at 102 which presents a circumferential sealing surface 104 intersected by an abrupt surface 106 corresponding to surface 64 of FIG. 1A. Surface 106 is presented at the mud side of the sealing element while the opposite surface 108 is presented at the lubricant side of the seal. A gradually tapered hydrodynamic lifting surface 110 is provided which defines multiple wave forms of other than sine-like configuration. These wave forms can take any suitable design configuration promoting the character of hydrodynamic lifting and lubricant pumping capability that is desired.

In FIG. 5, a similar linear diagram representation of a hydrodynamic lubricant seal is provided generally at 112 which forms a sealing surface 114 corresponding with surface 72 of FIG. 1A, for engagement with the metal cylindrical sealing surface 68 of the rotary cutter element 17. Seal member 112 defines an abrupt surface 116 at one axial extremity and a surface 118 at the opposite axial extremity corresponding with surface 80 of FIG. 1A. A tapered hydrodynamic lift surface 120 is also formed by the sealing element 112 which intersects the cylindrical sealing surface 114 in a triangular configuration defined by multiple straight intersecting lines 122 formed by radiused edges.

In FIG. 6, a lubricant seal is shown generally at 124 which is of hybrid design incorporating some of the features of the seal designs of both FIGS. 2 and 3. The sealing element defines an abrupt surface 126 on the mud side and an opposed surface 128 on the lubricant side. A hydrodynamic lift surface 130 is provided, intersecting sealing surface 132 at a sinusoidal line 134 forming lip 136. At appropriate areas about the circumference of the sealing element lubricant cavities 138 and 140 are defined which receive lubricant material transferred from the lubricant side of the sealing element. By virtue of flat surfaces 142 and 144 and curved surfaces 146 and 148, lubricant is transferred by hydrodynamic activity only toward the lubricant side from the recesses 138 and 140. In other locations along the periphery of the sealing element, hydrodynamic activity develops the contaminant flushing and lubricating activity described above in connection with FIG. 2.

FIG. 7 discloses a sealing element illustrated generally at 150 which defines a seal contact surface 152 and a hydrodynamic lift surface 154 similar to that described in conjunction with FIG. 2. The sealing element 150, however, as shown in FIG. 7A, is composed of a seal body 156 having a groove formed therein which receives an O-ring type sealing element 158. The seal body and sealing element may be composed of differing materials, if desired.

In FIG. 8, a sealing element is shown generally at 160 having a seal body 162 and a seal ring 164 of rectangular cross-section. Elements 162 and 164 cooperate to define sealing lips 166 and 168, sealing lip 166 being of sinusoidal form. The lip 168 is of circular form and defines a circular edge at the intersection thereof with the abrupt wiping surface 170 at the mud side of the seal. A lubricant cavity 171 is defined between the sealing lips 166 and 168.

Where two or more sealing lips are defined, the sealing lip on the mud side merely functions as a secondary seal whose primary function is to act as a barrier to mud ingress. As in the previous design, a positive pumping action created by the hydrodynamic action constantly maintains a minute quantity of fluid flow from the lubricant reservoir to the intermediate cavity, and from the intermediate cavity to the mud side. This keeps the seal interface flushed clean of any abrasive particles and maintains effective lubrication of the contact surfaces of the seal and the rotary cutter.

Another advantage of the hydrodynamically lubricated seal design is its ability to operate very effectively even under the pressure of high differential pressures. Hydrodynamic seal designs have been extensively tested with differential pressures up to 1,000 psi with virtually no wear. The high pressure fluctuations which are normally encountered in the drill bit do not exceed ±100 psi. In conventional O-ring or similar seal designs, these pressure fluctuations can increase the rate of wear. The hydrodynamic seal design can effectively withstand pressure fluctuations of this magnitude without squeezing the hydrodynamic lubricant film out from the sealing interface. In fact, it is possible to have some constant positive pressure on the lubricant side with such seal designs without any degradation of their service life. This may be advantageous to the seal operation and can be achieved by the use of a spring biasing means in the pressure equalizing systems of various drilling bit designs currently employed at the present time.

It has also been found that it is not necessary to utilize low durometer elastomers to provide adequate service life in hydrodynamic seals for drilling bits, rotary shafts and the like. With the use of elastomers having a hardness in the range of from 70 durometer to 85 durometer, the inventor has obtained long sealing life without any significant evidence of abrasive wear. The present seal design therefore functions equally well in high initial squeeze or low initial squeeze environments. The presence of lubricant film at the interface which separates the seal surface from the metal surface essentially eliminates abrasive wear action, thus making the role played by durometer hardness a secondary one.

As can be appreciated from the description of the hydrodynamically lubricated bit seal design set forth in the drawings, the seal has a very simple and compact configuration that overcomes all of the problems mentioned earlier with respect to present seal designs, thus greatly improving the performance, reliability and life of drilling bit seals. The seal cross-section does not take up any more axial space on the existing lug or cone geometries of drilling bits than is required for lubricant seals of conventional design and can therefore be easily installed into the seal pockets of most of the present bit designs as replacement seals. This is important, especially since the life of the various components within the drilling bit is very delicately balanced. Any reduction in the axial length available for the journal bearing or roller bearings employed in current rotary cone type drilling bits could reduce the bearing life and, therefore, the overall useful life of the bit. The hydrodyamic lubricant seal designs proposed were developed keeping in mind the dimensional constraints imposed by the current geometries of present rotary cone drill bits. Hydrodynamic lubricant seals will obviously provide significant increase in seal life without decreasing the life of other components of the drill bit.

Even though several specific seal geometries are discussed in detail herein, many other variations of the seal geometries employing the basic principles and teachings of this invention are possible. Moreover, hydrodynamic sealing elements can be provided which incorporate the beneficial advantages of a wide range of materials, including the use of two or more materials for the beneficial function thereof. It can also be appreciated that, even though a simple, one-piece integral seal construction is being employed in the proposed seal designs, it is possible to accomplish the same function with split or multiple piece designs. The dynamic sealing surface can be selected to be either on the cone or against the shaft by simply molding the hydrodynamic lip details on the outside diameter or inside diameter of the seal while maintaining all of the advantages of the invention discussed earlier. The inverted seal is installed in such a way that the hydrodynamic film takes place at the lug shaft rather than on the inside diameter of the drill bit cone as discussed in the detailed description.

In FIG. 11 is shown a circular sealing element 172 defining a contaminant side 174 and a lubricant side 176. Multiple inclinded grooves 178 are formed in the sealing element which intersects the lubricant face and the inner or outer peripheral surface 180 as the case may be. As shown, the included grooves are in oppositely directed groups so that seal lubrication will be hydrodynamically energized regardless of the direction of relative rotation. The groove 178 pick up lubricant and the inclined surface thereof provide a hydrodynamic wedging activity to create hydrodynamic seal lift in similar manner as described above. As before on the contaminant side a sharp scraping edge is defined.

What is claimed is:

1. In a rotary cone type drill bit having a cone support structure incorporating a body structure forming a liquid lubricant supply and a plurality of bit support legs, each leg having an axle supporting a roller cone cutter element in rotatable relation thereon, the improvement comprising:
    (a) a seal chamber being defined cooperatively by said roller cone cutter element and said cone support structure and being formed in part by a circular relatively rotatably movable sealing surface;
    (b) a resilient circular hydrodynamic sealing element disposed about said axle and within said seal chamber and maintaining a seal between said roller cone cutter element and said cone support structure and forming a sealed partition establishing a drilling fluid interface and a lubricant interface, said circular sealing element establishing a sealing interface with said circular rotatably movable sealing surface;
    (c) said lubricant interface being of a configuration acting cooperatively with said liquid lubricant to hydrodynamically induce lubricant wedging causing controlled unidirectional hydrodynamic pumping of lubricant from said lubricant interface through said sealing interface to said drilling fluid interface responsive to rotation of said roller cone cutter element about said axle for lubrication at said sealing interface and for lubricant flushing of solid particulate from said sealing interface; and
    (d) said drilling fluid interface being of a configuration acting cooperatively with said driling fluid to induce substantially no hydrodynamic back feeding drilling fluid pumping activity at said sealing interface responsive to rotation of said roller cone cutter element about said axle.

2. The improvement of claim 1, wherein:
the relative rotation between said lubricant interface of said sealing element and said circular rotatably movable surface in sealed engagement therewith develops a hydrodynamic seal lifting and wedging activity at said sealing interface inducing pumping movement of lubricant from said lubricant reservoir between said sealing element and said circular rotatably movable surface, said pumping movement having a velocity component acting toward said drilling fluid interface.

3. The improvement of claim 2, wherein:
    (a) said sealing element forms a tapered surface having converging, angulated relation with said circular, rotatably movable sealing surface; and
    (b) said hydrodynamic seal lifting and wedging activity is developed by said seal structure at said lubricant interface forming lateral and transverse velocity vectors, said lateral and transverse velocity vectors cooperatively working with said tapered, circular surface for inducing unidirectional pumping migration of lubricant film into said sealing interface from said lubricant interface to said drilling fluid interface and distributing said lubricant film about the circumference of said sealing interface.

4. The improvement of claim 1, wherein:
wave shaped portions of said sealing element at said lubricant interface define areas of seal/lubricant reaction inducing said hydrodynamic seal lifting and unidirectional hydrodynamic pumping activity.

5. The improvement of claim 4, wherein:
said sealing element defines a cylindrical sealing interface surface and forms an annular surface of tapered generally sinusoidal form extending from said lubricant interface surface and merging with said cylindrical sealing interface surface to form a generally sinusoidal line of intersection therewith on said lubricant interface side of said sealing element.

6. The improvement of claim 5, wherein:
said sealing element forms a second annular generally wave shaped tapered generally sinusoidal surface being substantially equally spaced along the circumferential length thereof with respect to tapered generally sinusoidal surface of said lubricant interface and forming a circumferential lubricant cavity spaced from said lubricant interface.

7. The improvement of claim 1, wherein:
said circular hydrodynamic sealing element defines a pair of circumferential sealing lips having sealing engagement with said circular relatively movable surface and being spaced to define circumferential lubricant cavity therebetween, said circumferential sealing lips each being of such wave shaped configuration as to act cooperatively with said liquid lubricant and induce net unidirectional hydrodynamic pumping of lubricant at said sealing interface toward said drilling fluid interface.

8. The improvement of claim 7, wherein:
portions of the circumferential sealing lip on the lubricant side of said circular hydrodynamic sealing element being of a configuration acting cooperatively with lubricant in said circumferential lubricant cavity to hydrodynamically induce unidirectional pumping of lubricant from said circumferential lubricant cavity toward said lubricant interface.

9. The improvement of claim 4, wherein:
said sealing element defines a plurality of intersecting tapered planar surfaces at said lubricant interface said intersecting tapered planar surfaces cooperating to form an annular saw-toothed wave pattern about said sealing element.

10. The improvement of claim 1, wherein:
said sealing element at said lubricant interface defines a plurality of grooves being inclined with respect to the circumferential direction of relative rotation, said grooves intersecting said lubricant interface and extending partly across said sealing interface.

11. The improvement of claim 10, wherein:
said grooves are arranged in alternating relation causing hydrodynamic lubricant pumping activity in said sealing interface from said lubricant interface to said drilling fluid interface for either direction of relative rotation between said sealing element of said rotatably movable sealing surface.

12. The improvement of claim 1, wherein:
said drilling fluid interface intersects said circular rotatably movable sealing surface in abrupt angular relation and develops substantially no transverse force vector with drilling fluid in contact therewith.

13. The improvement of claim 1, wherein:
said circular hydrodynamic sealing element is formed by a plurality of circular sealing members disposed in interfitting relation.

14. The improvement of claim 1, wherein:
said circular sealing element defines spaced peripheral lubricant cavity means between said drilling fluid interface and said lubricant interface, said spaced peripheral lubricant cavity means being disposed within the contact area of said circular hydrodynamic sealing element with said circular relatively rotatably movable sealing surface.

15. A circular sealing member forming a lubricant side at one axial extremity and a contaminant side at the opposite axial extremity and providing a contaminant barrier and lubricated seal between relatively rotatable surfaces in communication with a supply of liquid lubricant at one axial extremity thereof and a contaminant at the opposite axial extremity thereof comprising:
(a) a circular body of resilient sealing material defining inner and outer peripheral sealing surfaces, one of said peripheral sealing surfaces disposed for static sealing engagement with one of said relatively rotatable surfaces and the opposite one of said peripheral sealing surfaces defining a relatively rotatable sealing interface with the other of said relatively rotatable surfaces;
(b) a contaminant interface surface being formed by said circular body of sealing material and intersecting said other of said relatively rotatable surfaces in such angular relation as to form an abrupt circular scraping edge, upon relative rotary and axial movement of said relatively rotatable surfaces said abrupt circular scraping edge providing a scraping function preventing contaminants from entering the seal interface between said sealing surface and said other of said relatively rotatable surfaces, said contaminant interface surface developing substantially no hydrodynamic back feeding pumping activity at said contaminant interface upon relative rotational movement of said circular body of sealing material and contaminant material; and
(c) a tapered convoluted surface being formed by said circular body of sealing material on said lubricant side and disposed for contact with said liquid lubricant, said tapered convoluted surface acting cooperatively with said liquid lubricant during relative rotation of said opposite one of said peripheral surfaces and said other of said relatively rotatable surfaces to develop a hydrodynamic lubricant pumping activity inducing net unidirectional flow of lubricant in said seal interface from said convoluted surface of said lubricant side toward said abrupt circular scraping edge of said contaminant side.

16. A lubricant seal as recited in claim 15, wherein:
a said convoluted surface intersects said sealing surface in a repeating wave form having a plurality of wave cycles.

17. A lubricant seal as recited in claim 16, wherein:
said wave form is of sine wave configuration.

18. A lubricant seal as recited in claim 16, wherein:
said wave form is defined by plural straight line segments forming a saw-tooth like configuration.

19. A lubricant seal as recited in claim 15, wherein:
(a) said one of said peripheral sealing surfaces is defined by spaced peripheral sealing surface portions forming a lubricant cavity therebetween; and (b) one of said peripheral sealing surface portions forming convolutions on each side thereof and forming a convoluted contact area with said other of said relatively rotatable surfaces for developing hydrodynamic flow of lubricant from said lubricant interface toward said contaminant interface and from said lubricant cavity toward said lubricant interface and the other of said peripheral sealing surface portions defining a tapered convoluted surface on said lubricant side and a nonconvoluted surface with an abrupt scraping edge on said contaminant side.

20. A lubricant seal as recited in claim 19, wherein: said lubricant cavity is formed by a convoluted surface defined by said circular body of sealing material on the contaminant side of said lubricant cavity which develops hydrodynamic flow of lubricant in said sealing interface from said lubricant cavity toward said contaminant interface.

21. A lubricant seal as recited in claim 15, wherein: said circular body of sealing material is defined by interfitting circular body sections.

22. A lubricant seal member for establishing sealing between a housing and a shaft extending through the housing, wherein one of the housing and shaft is a rotating member and forms annular sealing surface means, said lubricant seal member adapted to establish a sealed partition between said housing and shaft and forming a lubricant side at one axial extremity for contact with liquid lubricant and a contaminant side at the opposite axial extremity for contact with any contaminant present at said contaminant side and comprising:
(a) a circular body of resilient sealing material defining inner and outer peripheral surface means, one of said inner and outer peripheral surface means adapted to establish a dynamic sealing interface with said annular sealing surface means;
(b) convoluted lubricant face surface means being defined by said circular body of resilient sealing material at said lubricant side and being of a tapered wave-like configuration developing a hydrodynamic lubricant wedging activity upon relative rotation of said housing and shaft with said liquid lubricant in contact with said lubricant face surface means, said hydrodynamic lubricant wedging activity developing net unidirectional lubricant film pumping at said dynamic sealing interface from said lubricant side to said contaminant side; and
(c) a contaminant face at said contaminant side being defined by said circular body of sealing material opposite said lubricant face and being of a configuration developing substantially no hydrodynamic back feeding pumping activity responsive to relative rotation of said housing and shaft with contaminant material and lubricant in contact with said contaminant face and thereby preventing the development of contaminant and contaminated lubricant migration in said sealing interface from said contaminant side to said lubricant side.

23. A lubricant seal member as recited in claim 22, wherein:
said lubricant face surface means defines at least one annular hydrodynamic sealing lip defining a wave form of at least one wave cycle, said hydrodynamic sealing lip forming at least one inclined surface cooperating with said sealing surface to form a circumferential hydrodynamic entrance zone of greater width toward the lubricant side and gradually tapering to the sealing contact zone of said annular sealing surface means and said one of said inner and outer peripheral surface means.

24. A lubricant seal member as recited in claim 23, wherein:
said contaminant face surface forms an angle of intersection with said one of said inner and outer peripheral surface means of such abrupt angular relation as to form a scraping edge for scraping away contaminant material from said sealing surface upon relative rotary and axial movement of said housing and shaft and eliminating any hydodynamic back feeding pumping activity at said contaminant face surface.

25. A lubricant seal member as recited in claim 24, wherein:
said angular relation includes a range of angles including both obtuse and acute angular relation.

26. A lubricant seal member as recited in claim 22, wherein:
said lubricant face surface means forms a radiused edge at the intersection of said lubricant face surface means with said one of said inner and outer peripheral surface means.

27. A lubricant seal member as recited in claim 22, wherein:
(a) said shaft defines annular sealing surface means for static seating of said lubricant seal member therewith; and
(b) said housing defines said annular dynamic sealing surface means.

28. A lubricant seal member as recited in claim 22, wherein:
(a) said housing defines annular seat means for static seating of said lubricant seal member therewith; and
(b) said shaft defines said annular sealing surface means.

29. A seal member establishing a seal between a relatively rotatable housing and shaft, comprising:
a ring-like body of resilient sealing material forming a sealed partition between said housing and shaft and forming a lubricant face, a contaminant face and at least one peripheral sealing lip in relatively rotatable interference sealing engagement with one of said housing and shaft and forming static sealing engagement with the other of said housing and shaft, said contaminant face being of such configuration as to generate substantially no hydrodynamic lift of said periheral sealing lip responsive to relative rotational movement of said contaminant face and contaminant, said lubricant face having a tapered convoluted annular configuration generating a hydrodynamic lift of said peripheral sealing lip thus inducing minute migration of lubricant from said lubricant face to said contaminant face at the seal interface of said peripheral sealing lip and said one of said housing and shaft.

* * * * *